(12) United States Patent
Matsumoto (10) Patent No.: US 7,525,693 B2
(45) Date of Patent: Apr. 28, 2009

(54) IMAGE READING APPARATUS AND IMAGE READING METHOD

(75) Inventor: Takayuki Matsumoto, Numazu (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 624 days.

(21) Appl. No.: 11/204,840

(22) Filed: Aug. 15, 2005

(65) Prior Publication Data
US 2007/0035783 A1 Feb. 15, 2007

(51) Int. Cl.
H04N 1/40 (2006.01)
(52) U.S. Cl. ...................... 358/461; 358/516
(58) Field of Classification Search ................. 358/461, 358/516
See application file for complete search history.

(56) References Cited

U.S. PATENT DOCUMENTS

| 6,075,621 A * | 6/2000 | Takeuchi et al. ............ 358/461 |
| 6,891,648 B2 * | 5/2005 | Inoue et al. ................. 358/516 |
| 2005/0011722 A1 * | 1/2005 | Nomura ...................... 194/207 |

FOREIGN PATENT DOCUMENTS

| JP | 2002-185726 | 6/2002 |
| JP | 2002-250977 | 9/2002 |
| JP | 2004-222180 | 8/2004 |

* cited by examiner

Primary Examiner—Twyler L. Haskins
Assistant Examiner—Michael Burleson
(74) Attorney, Agent, or Firm—SoCal IP Law Group LLP; Steven C. Sereboff; John E. Gunther (57) ABSTRACT

There is provided a technique that, when shading compensation is performed in an image reading apparatus, is less prone to be influenced by a smudge or the like adhered to a document glass or a white reference plate to be read by an optical reading system, and hence is able to contribute to an improvement in the quality of read images. Provision is made for an optical system control part that operates to make an optical reading system read a white reference plate through a document glass in a first predetermined range in a direction of movement of the optical reading system when an image of a document placed on the document glass is read by driving the optical reading system to move in a predetermined direction at the time of shading compensation, and make the optical reading system read the white reference plate through the document glass by the optical reading system in a second predetermined range in the direction of movement of the optical reading system when an image of a moving document is read by the optical reading system that is stopped at a predetermined position; and a compensation part that performs shading compensation based on image information obtained by the optical reading system reading the white reference plate in the predetermined ranges.

9 Claims, 8 Drawing Sheets

IMAGE READING APPARATUS AND IMAGE READING METHOD

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by any one of the patent disclosure as it appears in the Patent and Trademark Office patent files or records, but otherwise reserves all copyright and trade dress rights whatsoever

BACKGROUND OF THE INVENTION

1. Field of the Invention

The present invention relates to an image reading apparatus for reading an image of a document, and more particularly, it relates to the generation of reference data upon reading the image of the document.

2. Description of the Related Art

In an image reading apparatus for reading images of documents, there has been known one which is capable of performing manual reading in which the image of a document placed on a document glass is read by driving an optical reading system to move in a predetermined direction, and ADF reading (so-called flow reading) in which the image of a moving document is read by an optical reading system that is stopped at a predetermined position.

In the past, in the image reading apparatus as stated above, there has been disclosed a technique in which when the image of a document can not be correctly read due to dust, smudge, etc., adhered between the document glass and the document or to a lower portion of the document glass at the time of ADF reading, the optical reading system is moved to a position in which dust, smudge or the like is not adhered, so that the image of the document can be accurately read (see Japanese patent application laid-open No. 2002-185726 and Japanese patent application laid-open No. 2002-250977). The above-mentioned prior art is to avoid the occurrence of abnormality in image reading processing when a smudge or the like is adhered to the document glass at the time of ADF reading.

In addition, there has also been known a technique in which when dust, smudge or the like is adhered to a white reference plate that is used for shading compensation, defective pixels are detected by comparing, pixel by pixel, the value indicative of the gray level of an image signal when the white reference plate is read with a predetermined specified value, and if the number of continuous defective pixels concerned is more than or equal to a predetermined specified number of continuous pixels, it is determined that abnormality has occurred. In this prior art, the white reference plate is read in different line positions a plurality of times, and an abnormality determination is made based on an image signal obtained when reading the white reference plate in a line position with the least number of defective pixels, and when the presence of abnormality is not determined in the abnormality determination, a document is read in a line position with the least number of defective pixels, so that the influence on shading compensation can be reduced even if a smudge adheres to the white reference plate (Japanese patent application laid-open No. 2004-222180). In the above-mentioned prior art, if the presence of abnormality is not determined in the abnormality determination, shading compensation will be made with reference data including defective pixels even though the number thereof is small, so the document image can not be necessarily correctly read.

Moreover, in the prior art as stated above, no particular distinction is made between a region of the white reference plate to be read by the optical reading system when shading compensation is performed upon manual reading and a region of the white reference plate to be read by the optical reading system when shading compensation is performed upon ADF reading. Accordingly, it is general to read the same region on the white reference plate in both the cases when shading compensation is made upon manual reading and when shading compensation is made upon ADF reading, so in case where a smudge or the like concentrates around the region concerned, an influence will reach into both the shading compensation upon manual reading and the shading compensation upon ADF reading. Thus, it is undesirable from the viewpoints of image quality maintenance and processing efficiency that a smudge adhering to a certain region of the white reference plate or the document glass influences the shading compensation in both of these reading methods.

The present invention is intended to obviate the problems as referred to above, and has for its object to provide a technique that, when shading compensation is performed in an image reading apparatus, is less prone to be influenced by a smudge or the like adhered to a document glass or a white reference plate to be read by an optical reading system, and hence is able to contribute to an improvement in the quality of read images.

DETAILED DESCRIPTION OF THE INVENTION

Hereinafter, a preferred embodiment of the present invention will be described while referring to the accompanying drawings. Throughout this description, the embodiment and examples shown should be considered as exemplars, rather than limitations on the apparatus, methods and programs of the present invention.

Description of Systems

Figure 1:
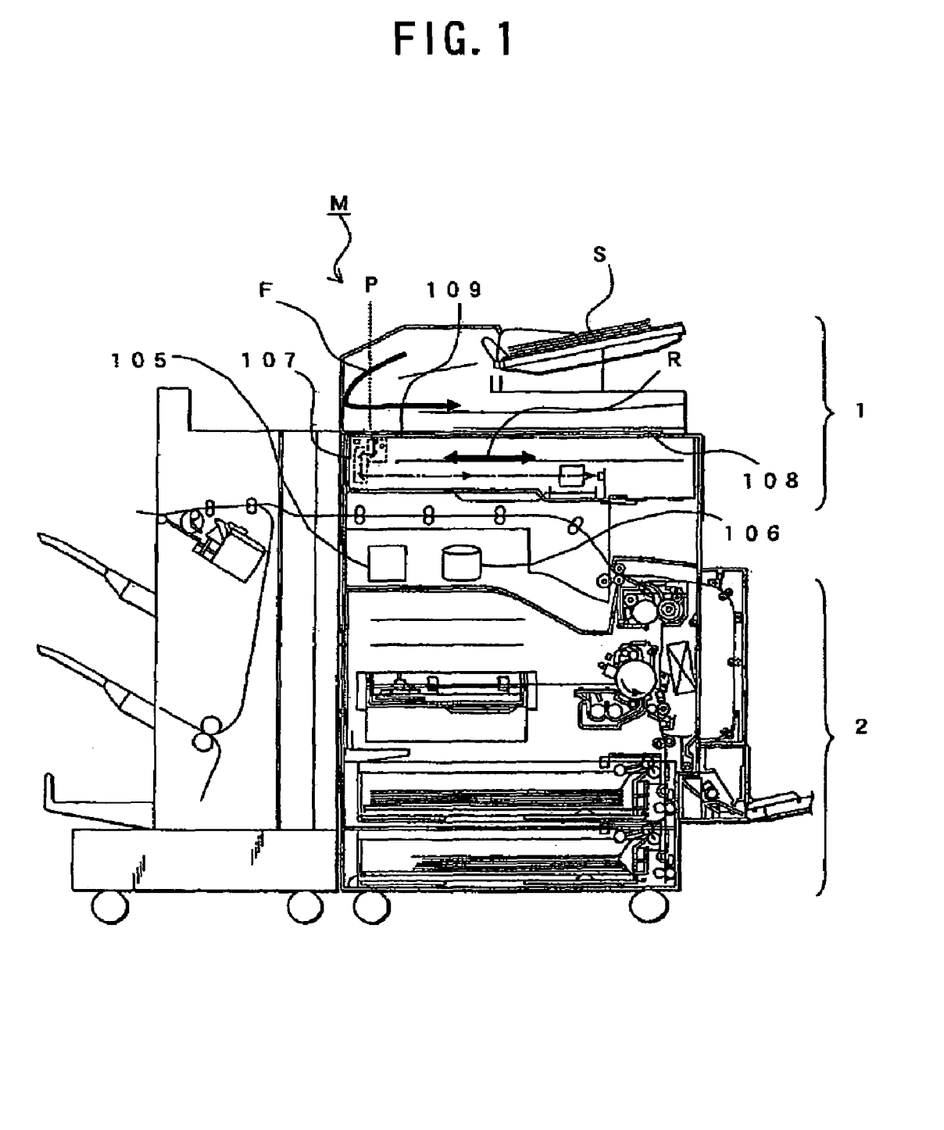
FIG. 1 is a functional block diagram for explaining an image reading apparatus according to one embodiment of the present invention.

FIG. 1 is a functional block diagram for explaining an image reading apparatus according to one embodiment of the present invention. The image reading apparatus 1 according to this embodiment is installed in an image processing apparatus (MFP: Multi Function Peripheral) M, as shown in this figure.

The image processing apparatus M shown in FIG. 1 is constructed to include the image reading apparatus 1 and an image forming apparatus 2, and in the image forming apparatus 2, image formation processing (copying processing) can be made based on the image data received from external equipment or the image data read from a document by the image reading apparatus 1.

The image reading apparatus 1 can perform manual reading in which the image of a document placed on a document glass 109 is read by driving an optical reading system 107 with a light source irradiating light on the document and mirrors reflecting the light reflected from the document to a light reception side to move in a predetermined direction R, and ADF reading in which the image of a document moving in an F direction (conveyed by an ADF (Auto Document Feeder)) is read by the optical reading system 107 that is stopped or stationary at a predetermined position P.

Figure 2:
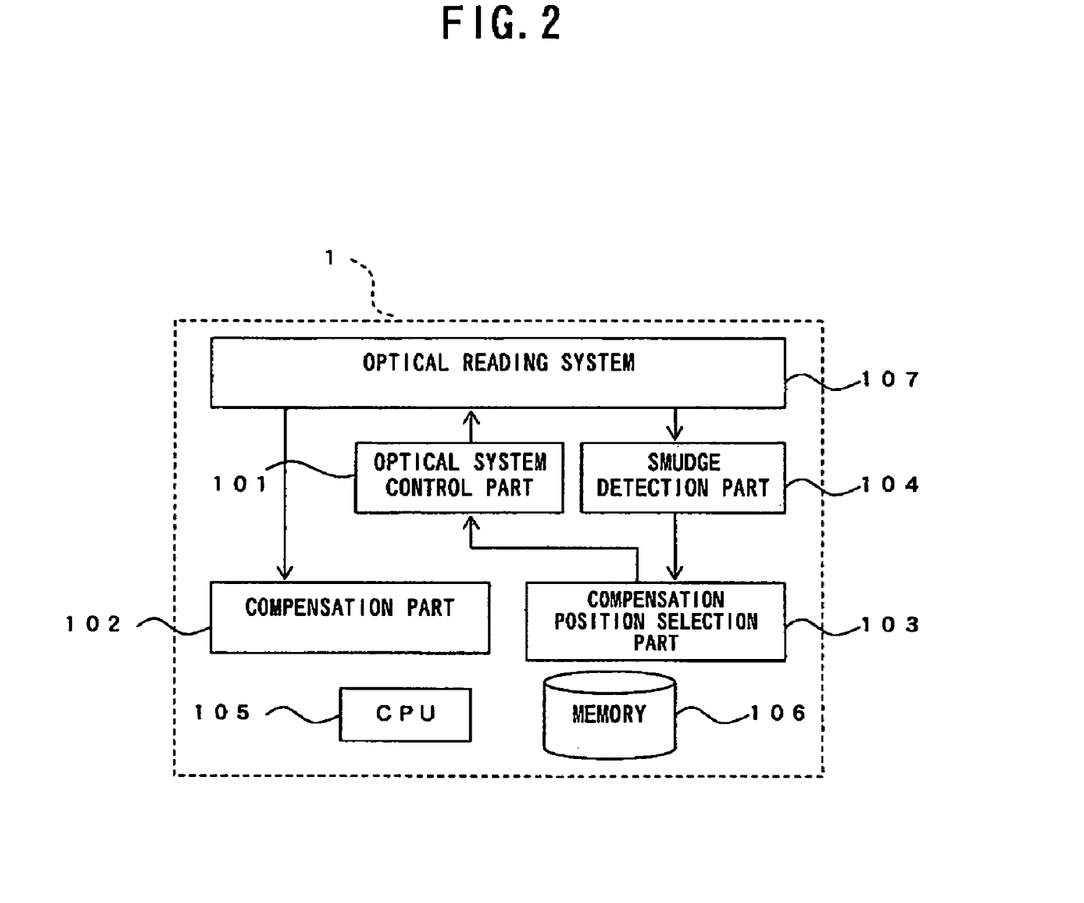
FIG. 2 is a functional block diagram showing the construction of the image reading apparatus according to this embodiment.

FIG. 2 is a functional block diagram that shows the construction of the image reading apparatus 1 according to this embodiment. The image reading apparatus 1 according to this embodiment includes an optical system control part 101, a compensationi part 102, a compensation position selection part 103, a smudge detection part 104, a CPU 105, a memory 106, and the optical reading system 107.

The optical system control part 101 has a role to make the optical reading system 107 read a white reference plate 108 through the document glass 109 in a first predetermined range in the direction of movement R of the optical reading system 107 when the image of a document placed on the document glass (platen glass) 109 is read by driving the optical reading system 107 to move in the predetermined direction R at the time of shading compensation, and at the same time has another role to make the optical reading system 107 read the white reference plate 108 through the document glass 109 in a second predetermined range in the direction of movement R of the optical reading system 107 when the image of a document S moving in the F direction is read by the optical reading system 107 that is stopped at the predetermined position P.

The compensation part 102 has a role to perform shading compensation based on the image information obtained by the optical reading system 107 reading the white reference plate 108 in the predetermined ranges as stated above.

The compensation position selection part 103 has a role to select a predetermined range to be read by the optical reading system 107 from among a plurality of predetermined set ranges when shading compensation is performed.

The smudge detection part 104 has a role to detect a smudge on the document glass or the white reference plate in a predetermined range by performing image processing based on the image information obtained by the optical reading system 107 reading the white reference plate in that predetermined range.

The CPU 105 has not only a role to perform a variety of kinds of processing in the image reading apparatus 1, but also a role to achieve various functions by performing programs stored in the memory 106. The memory 106 is constituted by a ROM, a RAM or the like, and has a role to store various kinds of information and programs used in the image reading apparatus 1.

Hereinafter, reference will be made to the schematic flow of processing in the image reading operation in the image reading apparatus 1.

First of all, when the power supply of the image reading apparatus 1 (here, the image processing apparatus M) is turned on, the initialization of the optical reading system 107 and peak detection control are carried out. Thereafter, when a copying operation is started in the image processing apparatus M based on a user's operation input, processes are carried out in the order of black shading compensation processing, the movement of the optical reading system 107 to a home position (in general, moving processing to the home position upon scanning), white shading compensation processing, and a scanning operation (forward rotation and reverse rotation).

Specifically, the initialization of the optical reading system 107 means position adjustment between those called coordinates in units of one step that manage a scanner (hereinafter called management coordinates), and their physical locations.

For example, a two phase stepping motor is used as a motor for driving the optical reading system 107, so that accurate position adjustment can be made in every one step. However, since the CPU has not yet recognized the current position of the scanner after the power supply was turned on, it is necessary, first of all, to make accurate matching between the physical location of the optical reading system 107 and the management coordinates managed by the CPU. Accordingly, processing called the initialization of the optical reading system 107 is carried out.

Subsequently, reference will be made to black shading compensation processing and white shading compensation processing.

The processing called shading compensation is needed before the image of the document is scanned by the optical reading system 107. In an image processing apparatus such as a digitalized copying machine, etc., the amount of light varies in individual parts of a CCD according to various factors such as the use of a linear light source (strictly stated, a collection of point light sources in case of a halogen lamp), convergence of reflected light by lens, the characteristic of a document lighting lamp, the shape of a reflector, etc. In addition, variation is caused in the amount of photoelectric conversion among the respective portions of several thousands of picture elements of the CCD, so the control to correct or compensate for such variation (relatively) to make the photoelectric conversion amount uniform for improved image quality is generically called shading compensation control. Since relative uniformization of white/black is necessary, shading compensation needs two kinds of processing including black shading compensation and white shading compensation.

The black shading compensation means processing to create a black reference for one line in a main scanning direction (error correction or compensation data upon reading black on each CCD pixel) by moving the scanner to a position under a black reference compensation plate (or moving the scanner to a dark location into which no external light comes while turning off an exposure lamp). The white shading compensation means processing to create a white reference (error correction or compensation data when reading white on each CCD pixel) in a position under the white reference plate 108. In this white shading compensation (and black shading compensation), sampling is carried out under the white reference plate 108 during the scanning of the optical reading system 107.

At the time of reading an image, the image reading is carried out based on this shading compensation data, and output values between the respective CCD pixels in the main scanning direction are corrected or compensated, whereby image reading can be carried out with the averaged image without surface roughness.

Figure 3:
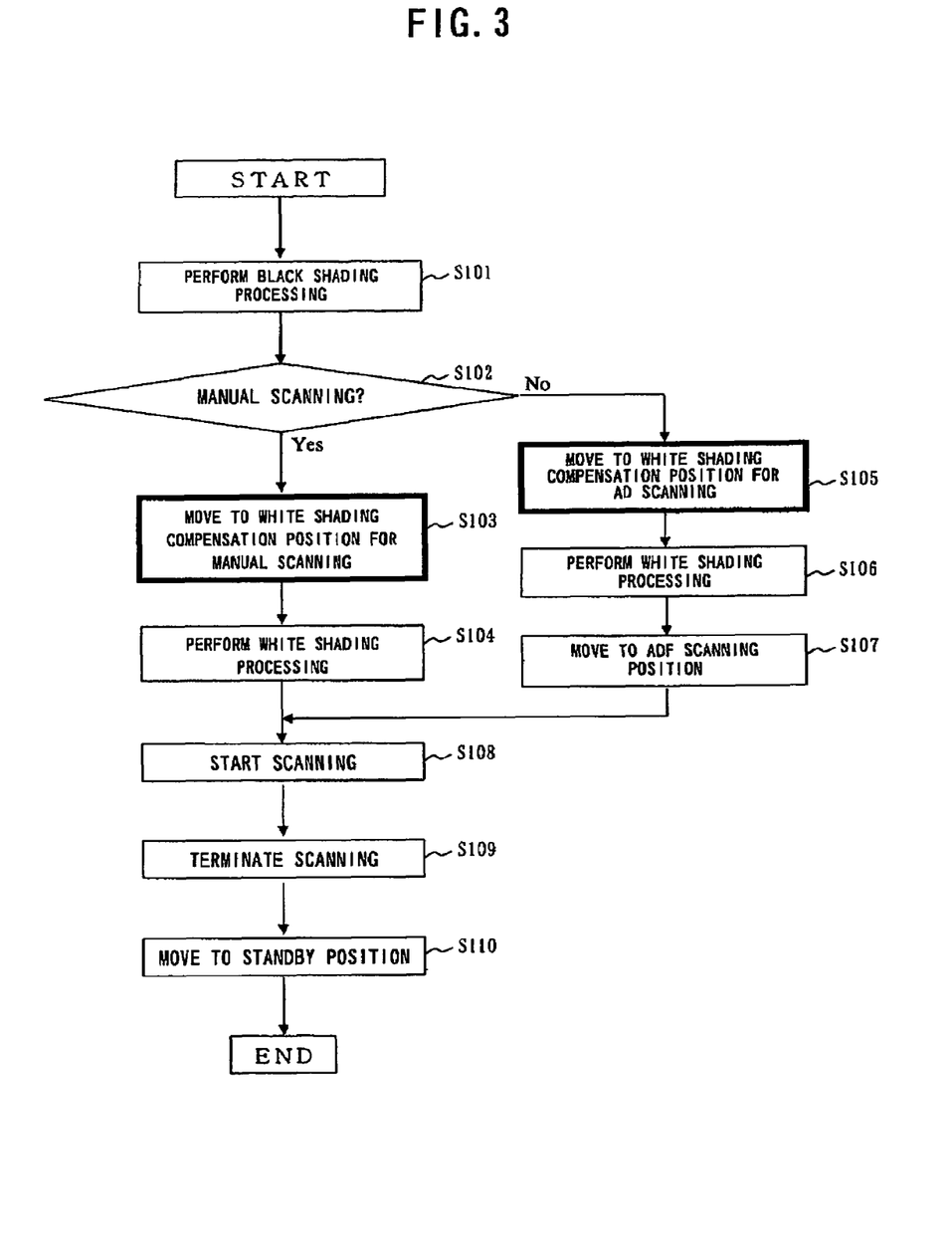
FIG. 3 is a flow chart for explaining the flow of processing (an image reading method) in the image reading apparatus according to this embodiment.

FIG. 3 is a flow chart for explaining the flow of processing (image reading method) in the image reading apparatus according to this embodiment.

When image reading processing is started, black shading processing is first carried out (S101).

When the image of a document placed on the document glass 109 is read by driving the optical reading system 107 to move in the predetermined direction at the time of shading compensation (S102, Yes), the optical system control part 101 operates to make the optical reading system 107 read the white reference plate 108 through the document glass 109 in the first predetermined range in the direction of movement R of the optical reading system 107 (S103).

Here, note that the first predetermined range is set in plurality as T1 through T6 (see FIG. 4), and the nearest one to the reading area among a plurality of predetermined ranges that have not yet been selected when the shading compensation is performed is selected by the compensation position selection part 103 as the position (a predetermined range to be read by the optical reading system) to which the optical reading system 107 is moved by the optical system control part 101 in the above-mentioned optical system control step (a compensation position selection step).

When manual reading is performed, the optical reading system 107 in the image reading apparatus 1 according to this embodiment is first moved from a predetermined standby position (located to the right in FIG. 4) in an R(1) direction to the predetermined position P at which the optical reading system 107 is stopped at the time of ADF reading, and thereafter reads the image of the document placed on the document glass 109 while being moved in an R(2) direction to return to the predetermined standby position. Thus, the compensation position selection part 103 first selects a range T1 that is the nearest to the reading area as the first predetermined range.

Figure 4:
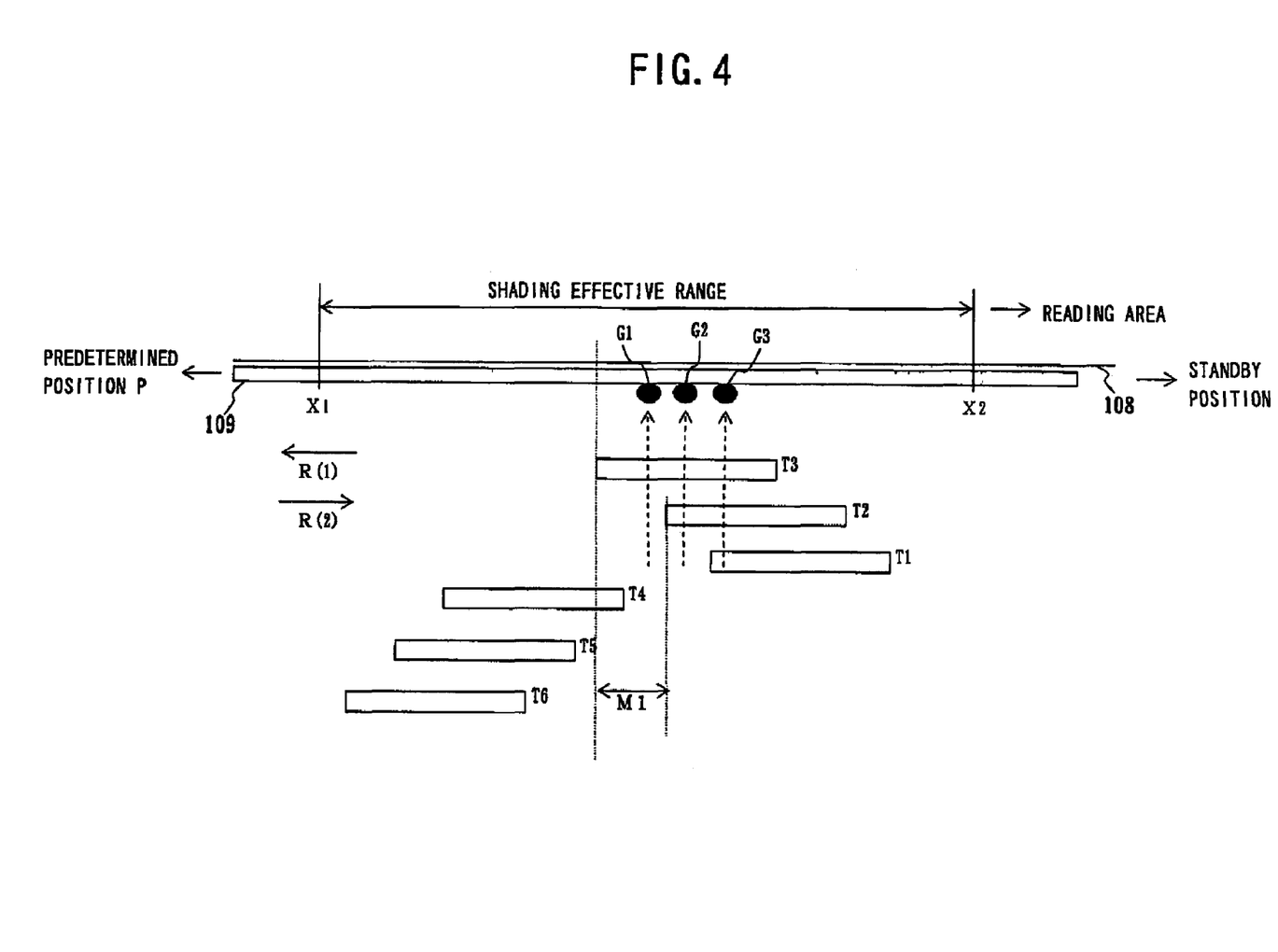
FIG. 4 is a view for explaining a first predetermined range.

In this manner, by setting the first predetermined range to an area in the upstream vicinity of the reading area in the direction of movement of the optical reading system 107 when the optical reading system 107 is moved to the reading area in which the image of the document is read, it is possible to perform shading compensation in substantially the same lighting state as that (the amount of light, etc.) of the optical reading system 107 when the reading area is lit or eliminated.

The compensation part 102 performs white shading compensation based on the image information obtained by the optical reading system 107 reading the white reference plate 108 in the first predetermined range (compensation step) (S104).

On the other hand, when the image of a moving document S is read by the optical reading system 107 that is stopped at the predetermined position P, the optical system control part 101 makes the optical reading system 107 read the white reference plate 108 through the document glass 109 in a second predetermined range in the direction of movement of the optical reading system 107 (an optical system control step) (S105).

Here, note that the second predetermined range is set in plurality as A1 through A6 (see FIG. 5), and the nearest one to the reading area among a plurality of predetermined ranges that have not yet been selected when the shading compensation is performed is selected by the compensation position selection part 103 as the position (a predetermined range to be read by the optical reading system) to which the optical reading system 107 is moved by the optical system control part 101 in the above-mentioned optical system control step (a compensation position selection step).

When ADF reading is performed, the optical reading system 107 in the image reading apparatus 1 according to this embodiment is first moved from a predetermined standby position (located to the right in FIG. 5) in an R(3) direction to the predetermined position P at which the optical reading system 107 is stopped at the time of ADF reading, and then reads, at the predetermined position P, the image of the document S being conveyed. Thus, the compensation position selection part 103 first selects a range A1 that is the nearest to the reading area as the second predetermined range.

The compensation part 102 performs white shading compensation based on the image information obtained by the optical reading system 107 reading the white reference plate 108 in the second predetermined range (compensation step) (S106).

Figure 5:
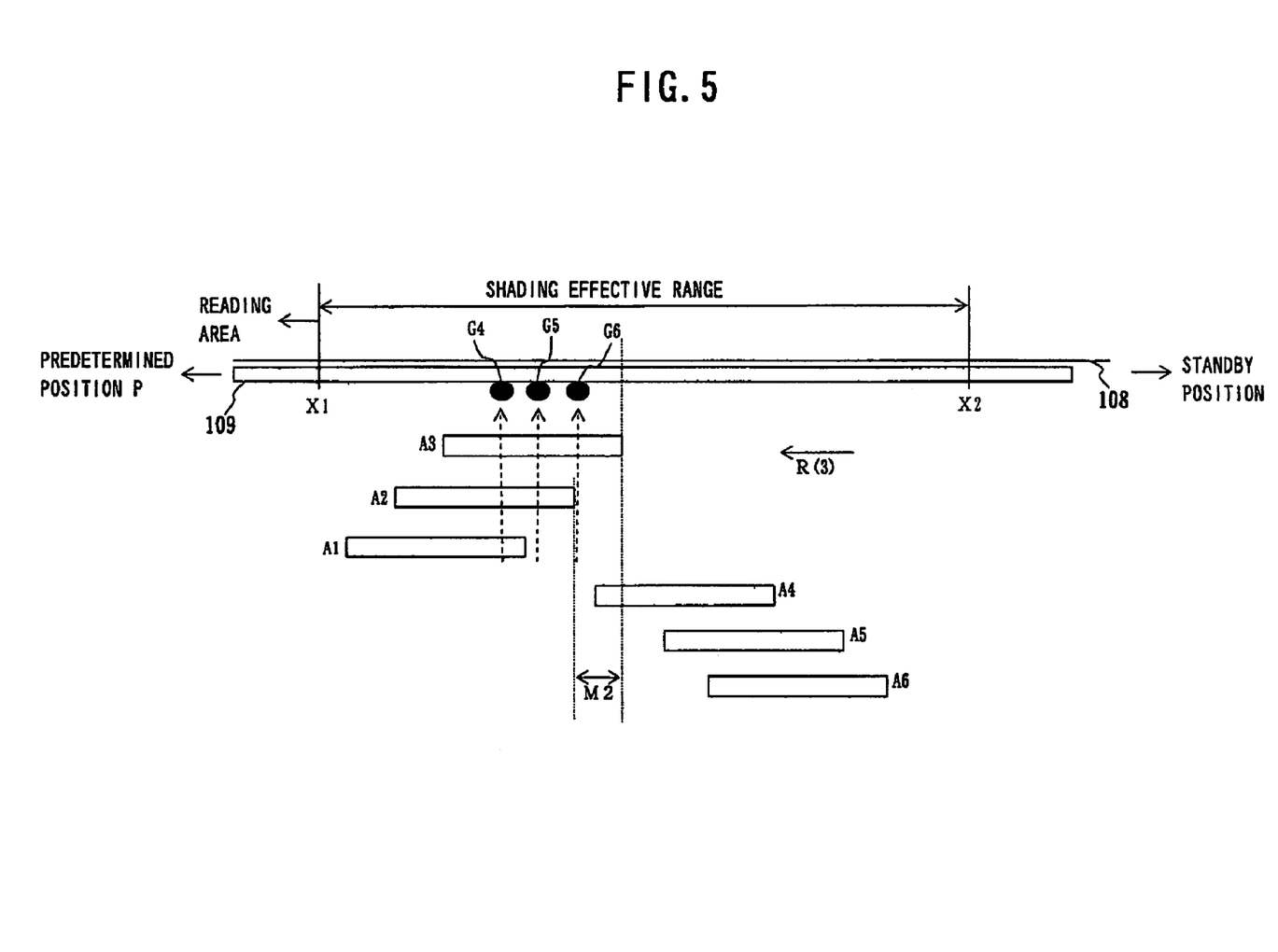
FIG. 5 is a view for explaining a second predetermined range.

In this manner, in this embodiment, a predetermined range in which the white reference plate is read at the time of shading compensation is set so as to be different between when manual reading is performed and when ADF reading is performed. As a result, in case where a smudge adheres to the shading compensation plate in a certain area thereof lying within a shading effective range, for example, shading compensation is never influenced by the smudge in both the cases when manual reading is performed and when ADF reading is performed. Here, note that in this embodiment, the first predetermined range (T1 through T6) for performing manual reading is set to be nearer to the predetermined position P than the second predetermined range (A1 through A6) for performing ADF reading.

Then, the optical system control part 101 drives the optical reading system 107 to move to the predetermined position P (S107).

Subsequently, the reading of the image of the document by the optical reading system 107 is started (S108), and when the image reading operation for the size of the document is completed (S109), the scanner is moved to return to the predetermined standby position (S110).

Figure 6:
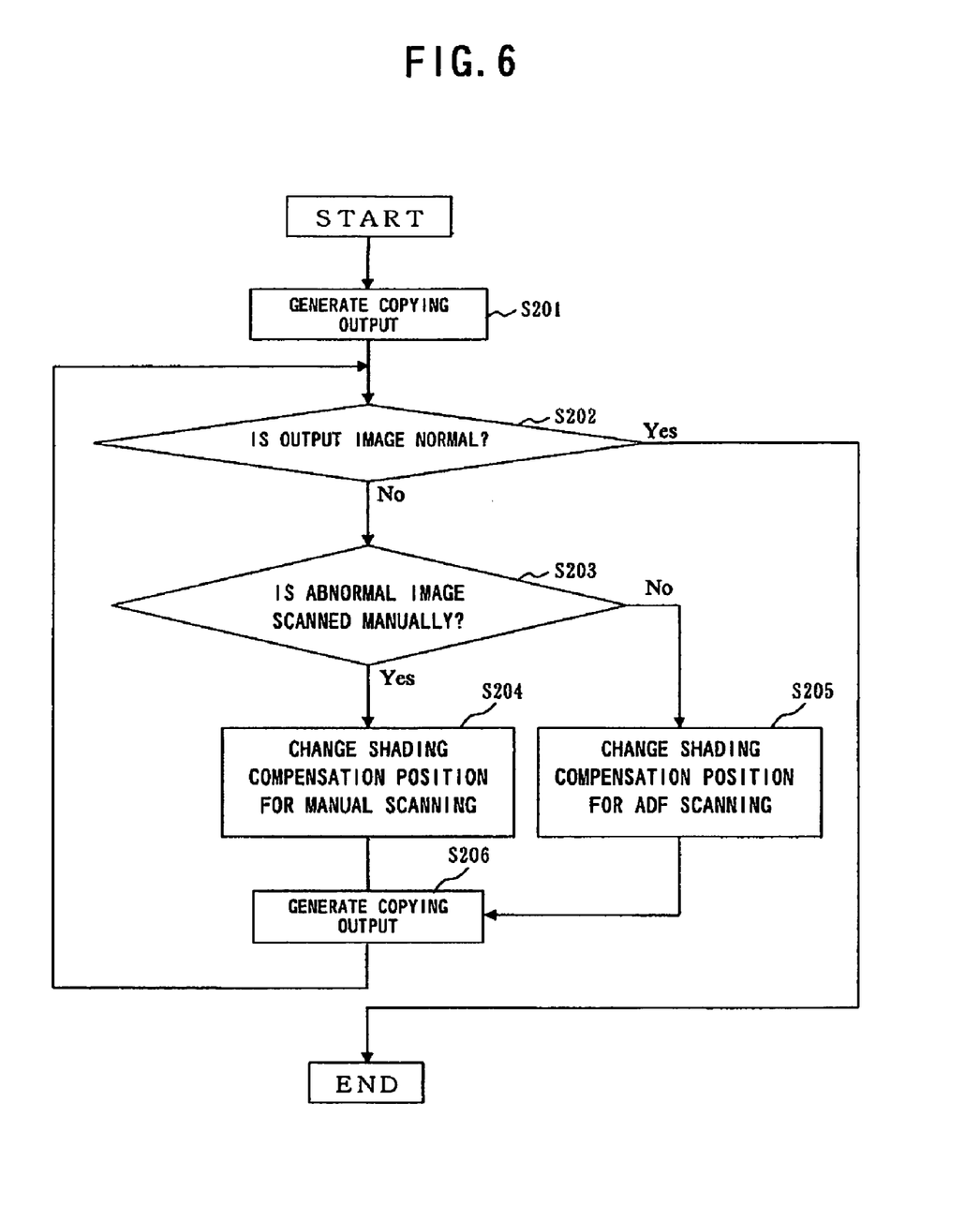
FIG. 6 is a flow chart showing the flow of shading compensation processing in case where there is a smudge adhered to a white reference plate or a document glass.

FIG. 6 is a flow chart that shows the flow of the processing of shading compensation when a smudge adheres to the white reference plate or the document glass.

Figure 7:
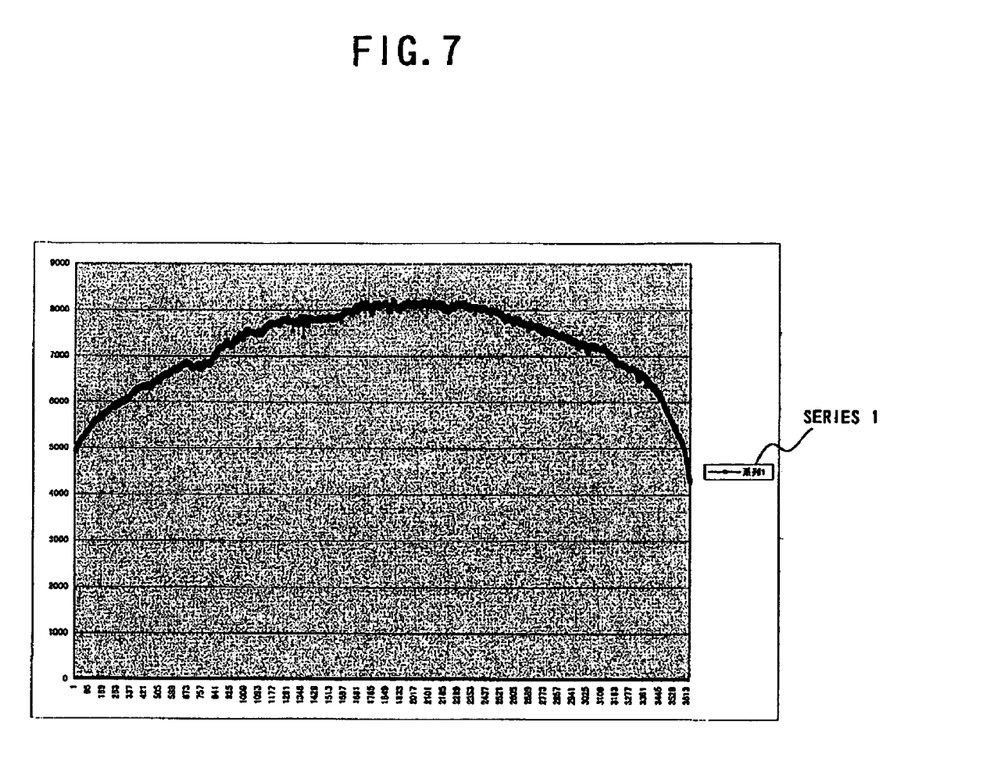
FIG. 7 is a view showing one example of shading compensation data acquired in a state where there is no smudge on the white reference plate and the document glass.
Figure 8:
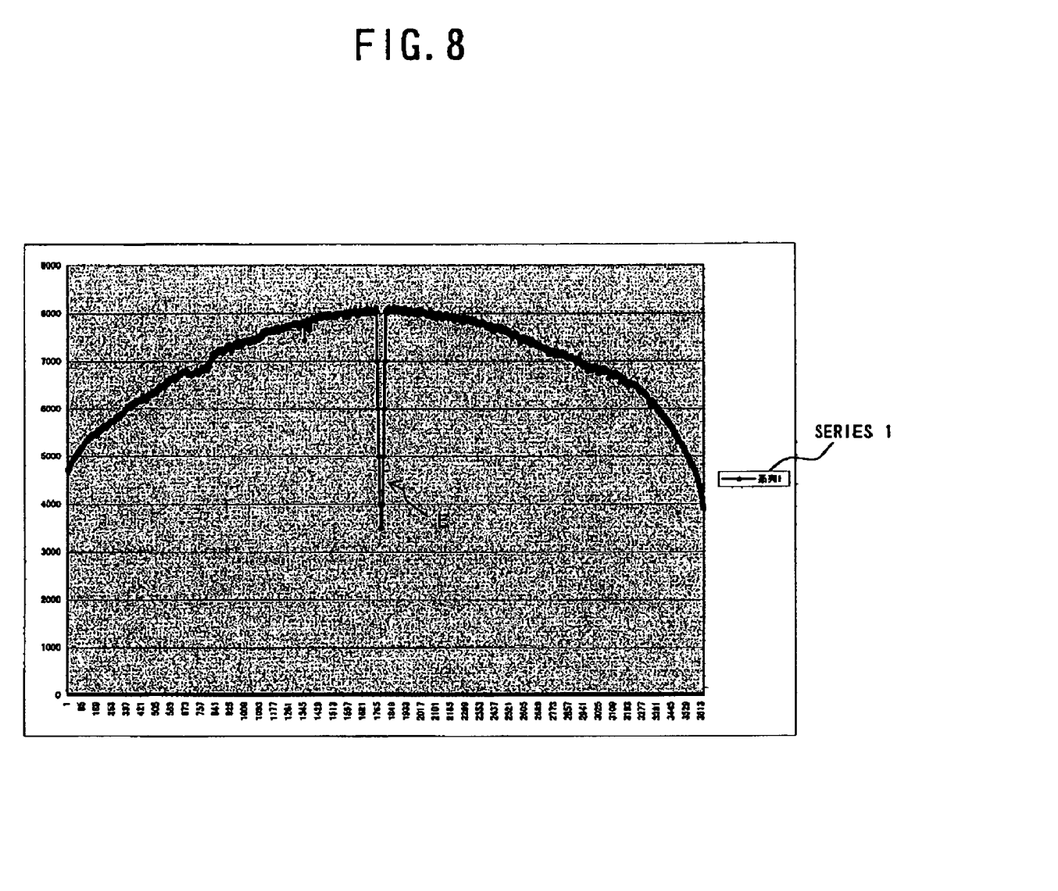
FIG. 8 is a view showing one example of shading compensation data acquired in a state where there is a smudge on the white reference plate or the document glass.

Copying processing is started (S201), and when there is abnormality in an image output by the copying processing (there is a stripe or streak in the output image, etc.) (S202, No), a determination is made that there exists shading compensation abnormality, and it is determined whether the copying processing is carried out either by manual reading or by ADF reading (S203). FIG. 7 shows shading compensation data acquired with no smudge on the white reference plate and the document glass, and FIG. 8 shows one example of shading compensation data acquired with the presence of a smudge on the white reference plate or the document glass. As shown in FIG. 8, it is found that abnormality appears in the data in the case of the adhesion of dust, etc., (see E in FIG. 8).

Here, note that in this embodiment, it is constructed such that a smudge on the document glass 109 or the white reference plate 108 in a predetermined range is detected by the smudge detection part 104 based on the image information obtained by reading the white reference plate 108 in the predetermined range by means of the optical reading system 107 (a smudge detection step).

In case of manual reading (S203, Yes), the compensation position selection part 103 changes the first predetermined range (e.g., from T1 to T2), and thereafter image reading by the optical reading system 107 is carried out again (S204).

On the other hand, in case of ADF reading (S203, No), the compensation position selection part 103 changes the second predetermined range (e.g., from A1 to A2), and thereafter image reading by the optical reading system 107 is carried out again (S205).

Thus, at the start, a predetermined range, which is the nearest to the reading area, is selected from among the plurality of predetermined ranges set, and when a smudge is detected, predetermined ranges, which are successively further away from the reading area, are selected (e.g., in the order of T1, T2, T3, T4, T5 and T6 or in the order of A1, A2, A3, A4, A5 and A6).

Moreover, the method of changing the predetermined range is not necessarily limited to the above-mentioned one, but in case where shading data (white reference values) become abnormal only in the part of the dust G1 lying on an optical path between the white reference plate 108 and the CCD (see FIG. 8) when shading compensation is carried out within the range T3 in the case of adhesion of dust G1 to the white reference plate 108 for example, the predetermined range may be changed to the range T2 so as to avoid the dust G1. In addition, if dust G2 adheres to the white reference plate 108, the position or range T2 will be influenced by the dust G2 at the time of shading compensation, so the predetermined range is changed to the range T1 thereby to avoid the dust G2.

Further, if dust G3 adheres to the white reference plate 108, any of the positions or ranges of T1 through T3 will be influenced by the dust G3 at the time of shading compensation, and hence the predetermined range is further changed to the range T4 where shading compensation is carried out. In this manner, shading compensation can be performed without receiving the influence of a smudge such as dust, etc.

If an output image based on the image data obtained by reading the white reference plate after the predetermined range has been appropriately changed as stated above is normal, it is assumed that shading compensation is carried out in a normal manner, and hence the processing is terminated, whereas as long as there is abnormality in the output image, the above processing is repeated until the image is output normally.

Here, note that in case where a smudge is detected by the smudge detection part 104, the compensation position selection part 103 in this embodiment is able not to select a predetermined region in which the smudge has been detected at the time when the next shading compensation is performed. By doing so, the region that is unclean or soiled due to the adhesion of dust, etc., is never read again upon the next shading compensation, and hence unnecessary processing can be omitted.

In addition, the above-mentioned plurality of predetermined ranges are not fixed in their positions and can be moved to the right and left direction in FIG. 4 and FIG. 5 by changing an adjustment bit value. The moving distance of the predetermined range in that case can be set as an amount of one step movement (full step) of the motor per one adjustment bit. However, there is an effective range in the white reference compensation plate, and shading compensation must be made within the effective range, and hence is carried out within a range of X1-X2.

The respective steps in the processing of the above-mentioned image reading apparatus are achieved by making the CPU 105 execute image reading programs stored in the memory 106.

Although in the embodiment of the present invention, functions for realizing the present invention are recorded or stored beforehand in the interior of the apparatus, the present invention is not limited to this but similar functions can be downloaded into the apparatus via a network, or a recording medium storing therein similar functions can be installed in the apparatus. Such a recording medium can be of any form, such as for example a CD-ROM, which is able to store programs and which is able to be read out by the apparatus. In addition, the functions to be obtained by such preinstallation or downloading can be achieved through cooperation with an OS (operating system) or the like in the interior of the apparatus.

As described above, according to the embodiment of the present invention, even in case where shading compensation data might become abnormal to influence an output image due to small dust and smudges that are hard to be visually checked with the naked eye, it is possible to output a normal image by changing the compensation position without accompanying an operation to clean or replace the white reference plate.

It is needless to say that according to this embodiment, it is possible to provide an image processing apparatus (MFP: Multi Function Peripheral), a digital copying machine, a degital multifunction machine, and a facsimile machine that are provided with an image reading apparatus as constructed above.

The present invention is not limited to the above-mentioned embodiment as it is, but can be put into practice with its component elements being changed or modified within the range not departing from the gist of the invention at its execution stage. In addition, a variety of inventions can be formed by properly combining a plurality of component elements disclosed in the above embodiment. For example, some component elements may be omitted from all the component elements shown in the embodiment. Further, component elements over different embodiments may be properly combined.

As described in detail above, according to the present invention, there can be provided a technique that, when shading compensation is performed in an image reading apparatus, is hard to be influenced by smudges or the like adhered to a document glass or a white reference plate to be read by an optical reading system, and hence is able to contribute to an improvement in the quality of read images.

It is claimed:

1. An image reading apparatus comprising:
   an optical reading system adapted to move in a predetermined direction to read an image of a stationary document placed on a document glass and to remain at a predetermined position to read an image of a moving document;
   an optical system control part that operates to:
      when the optical reading system reads a stationary document, make the optical reading system obtain first shading compensation data by reading a white reference plate through the document glass in a first predetermined range along the direction of movement of said optical reading system, and
      when the optical reading system reads a moving document, make said optical reading system obtain second shading compensation data by reading said white reference plate through said document glass in a second predetermined range different from the first predetermined range along the direction of movement of said optical reading system; and
   a compensation part that performs shading compensation based on the first shading compensation data when the optical reading system reads a stationary document and performs shading compensation based on the second shading compensation data when the optical reading system reads a moving document.

2. The image reading apparatus as set forth in claim 1, wherein said first and second predetermined ranges are located in the upstream vicinity of a reading area in the direction of movement of said optical reading system when said optical reading system is moved to said reading area in which the image of said document is read.

3. The image reading apparatus as set forth in claim 1, wherein
each of the first and second predetermined ranges can be set to a plurality of predetermined ranges, respectively;
said apparatus further comprises a compensation position selection part that selects a predetermined range to be read by said optical reading system from among said plurality of predetermined ranges thus set when shading compensation is performed; and
said compensation position selection part selects the nearest one to said reading area among predetermined ranges that have not yet been selected when said shading compensation is performed.

4. The image reading apparatus as set forth in claim 3, further comprising:
a smudge detection part that detects a smudge on said document glass or said white reference plate based on one of the first shading compensation data and the second shading compensation data obtained by said optical reading system reading said white reference plate;
wherein in case where a smudge is detected by said smudge detection part, said compensation position selection part does not select a predetermined region in which said smudge has been detected at the time when the next shading compensation is performed.

5. An image reading apparatus comprising:
an optical reading system adapted to move in a predetermined direction to read an image of a stationary document placed on a document glass and to remain at a predetermined position to read an image of a moving document;
an optical system control part that operates to:
when the optical reading system reads a stationary document, make the optical reading system obtain first shading compensation data by reading a white reference plate through the document glass in a first predetermined range along the direction of movement of said optical reading system, and
when the optical reading system reads a moving document, make said optical reading system obtain second shading compensation data by reading said white reference plate through said document glass in a second predetermined range that is set in a location farther away from the predetermined position along the direction of movement of said optical reading system than said first predetermined range; and
a compensation part that performs shading compensation based on the first shading compensation data when the optical reading system reads a stationary document and performs shading compensation based on the second shading compensation data when the optical reading system reads a moving document.

6. A method for reading an image using an optical reading system adapted to move in a predetermined direction to read an image of a stationary document placed on a document glass and to remain at a predetermined position to read an image of a moving document, the method comprising:
when the optical reading system reads a stationary document, the optical reading system obtaining shading compensation data by reading a white reference plate through a document glass in a first predetermined range along the direction of movement of said optical reading system;
when the optical reading system reads a moving document, the optical reading system obtaining shading compensation data by reading said white reference plate through said document glass in a second predetermined range, different from the first predetermined range, along the direction of movement of said optical reading system; and
performing shading compensation based on the shading compensation data.

7. The image reading method as set forth in claim 6, wherein said first and second predetermined ranges are located in the upstream vicinity of a reading area in the direction of movement of said optical reading system when said optical reading system is moved to said reading area in which the image of said document is read.

8. The image reading method as set forth in claim 6, wherein
each of the first and second predetermined ranges can be set to a plurality of predetermined ranges, respectively;
said method further comprises selecting a predetermined range to be read by said optical reading system from among said plurality of predetermined ranges thus set when shading compensation is performed and selecting the nearest one to said reading area among predetermined ranges that have not yet been selected when said shading compensation is performed.

9. The image reading method as set forth in claim 8, further comprising:
detecting a smudge on said document glass or said white reference plate in said predetermined range based on the shading compensation data;
wherein in case where a smudge is detected a predetermined region is not selected in which said smudge has been detected at the time when the next shading compensation is performed.

* * * * *